(12) United States Patent
Mette et al.

(10) Patent No.: US 11,440,077 B2
(45) Date of Patent: Sep. 13, 2022

(54) METHOD FOR PRODUCING A SEALED FOLDED CONNECTION

(71) Applicant: tesa SE, Norderstedt (DE)

(72) Inventors: Christoph Mette, Hamburg (DE); David Tuffe, Norderstedt (DE); Klaus Keite-Telgenbüscher, Hamburg (DE)

(73) Assignee: TESA SE, Norderstedt (DE)

( * ) Notice: Subject to any disclaimer, the term of this patent is extended or adjusted under 35 U.S.C. 154(b) by 576 days.

(21) Appl. No.: 16/534,323

(22) Filed: Aug. 7, 2019

(65) Prior Publication Data

US 2020/0055107 A1 Feb. 20, 2020

(30) Foreign Application Priority Data

Aug. 16, 2018 (DE) .............. 10 2018 213 824.9

(51) Int. Cl.
*B60J 7/00* (2006.01)
*B21D 39/02* (2006.01)
(Continued)

(52) U.S. Cl.
CPC .......... *B21D 39/028* (2013.01); *B62D 27/00* (2013.01); *B62D 29/005* (2013.01); *B62D 65/024* (2013.01)

(58) Field of Classification Search
CPC ....... B32B 7/12; B32B 2439/70; B32B 27/08; Y02E 10/50; C09J 7/38; C09J 7/21; C09J 2203/302; C09J 2400/263; C09J 2433/00
See application file for complete search history.

(56) References Cited

U.S. PATENT DOCUMENTS 4,719,689 A * 1/1988 Yamamoto ............. B60J 5/0469
29/458
5,470,416 A * 11/1995 Herring, Jr ........... F16B 11/006
156/196
(Continued)

FOREIGN PATENT DOCUMENTS

DE 10 2016 220 237 A1 4/2018
EP 0 877 069 A1 11/1988
(Continued)

OTHER PUBLICATIONS

German Office Action corresponding to German Patent Application No. 10 2018 213 824.9, dated Apr. 23, 2019.
(Continued)

*Primary Examiner* — Kiran B Patel
(74) *Attorney, Agent, or Firm* — Norris McLaughlin, P.A.

(57) ABSTRACT

Systems and methods produce or provide a folded connection, sealed by means of an adhesive composition, between a first sheetlike element and a second sheetlike element. The systems and methods bond a second flange of the second sheetlike element with at least one layer of an adhesive composition to a first flange of the first sheetlike element, in such a way that an end of the second flange of the second sheetlike element is indented by a distance relative to an end of the first flange of the first sheetlike element. The systems and methods bead the first flange of the first sheetlike element around the second flange of the second sheetlike element and, after the beading, an adhesive-composition part is placed around an edge of the first flange of the first sheetlike element and bonded to a second surface of the first flange of the first sheetlike element.

18 Claims, 4 Drawing Sheets

(51) Int. Cl.
*B62D 27/00* (2006.01)
*B62D 29/00* (2006.01)
*B62D 65/02* (2006.01)

(56) References Cited

U.S. PATENT DOCUMENTS

| | | | |
|---|---|---|---|
| 6,000,118 A * | 12/1999 | Biernat | B21D 39/02 156/196 |
| 6,063,494 A | 5/2000 | Schümann et al. | |
| 6,074,506 A * | 6/2000 | Herring, Jr | B29B 7/7605 156/196 |
| 6,294,270 B1 | 9/2001 | Clough | |
| 6,478,915 B1 | 11/2002 | Schmalbrusch et al. | |
| 6,696,147 B1 * | 2/2004 | Herring, Jr | F16B 11/006 428/407 |
| 8,415,418 B2 | 4/2013 | Kohlstrung et al. | |
| 11,142,382 B1 * | 10/2021 | Hayes | C09J 7/20 |
| 11,279,856 B2 * | 3/2022 | Langeman | C09J 7/203 |
| 2005/0109769 A1 * | 5/2005 | McClure | B21D 39/021 219/633 |
| 2010/0137530 A1 | 6/2010 | Arai et al. | |
| 2012/0111488 A1 | 5/2012 | Sheasley et al. | |
| 2012/0148856 A1 | 6/2012 | Kojlstrung et al. | |
| 2019/0255832 A1 * | 8/2019 | Keite-Telgenbüscher | B62D 27/026 |

FOREIGN PATENT DOCUMENTS

| | | |
|---|---|---|
| EP | 0 842 995 A1 | 5/1998 |
| EP | 0 830 530 B1 | 8/2000 |
| EP | 1 041 130 A2 | 10/2000 |
| EP | 1 334 161 A1 | 8/2003 |
| EP | 1 451 010 A1 | 9/2004 |
| WO | 96/021704 A2 | 7/1996 |
| WO | 2004/108401 A2 | 12/2004 |
| WO | 2009/071269 A1 | 6/2009 |
| WO | 2011/020714 A1 | 2/2011 |
| WO | 2011/112643 A1 | 9/2011 |
| WO | 2012/166257 A1 | 12/2012 |
| WO | 2013/101693 A1 | 7/2013 |
| WO | 2018/073140 A2 | 4/2018 |

OTHER PUBLICATIONS

Donatas Satas, "Handbook of Pressure Sensitive Adhesive Technology" (van Nostrand, 1989).

* cited by examiner

METHOD FOR PRODUCING A SEALED FOLDED CONNECTION

This application claims foreign priority benefit under 35 U.S.C. § 119 of German Application No. 10 2018 213 824.9 filed Aug. 16, 2018.

The present invention relates to a method for producing a folded connection, sealed by means of an adhesive composition, between a first sheetlike element, which comes to lie externally in the fold, and a second sheetlike element, which comes to lie internally in the fold, where a flange of the first sheetlike element is taken back over a flange of the second sheetlike element and where the flange of the first sheetlike element has a first surface and a second surface, comprising the steps of:
(I) applying at least one layer of an adhesive composition to the flange of the first sheetlike element;
(II) beading the flange of the first sheetlike element around the flange of the second sheetlike element,
and also to a folded connection obtainable by this method, to the use of an adhesive tape for producing a folded connection sealed by means of an adhesive composition, and to a double-sided adhesive tape for producing a sealed folded connection.

A folded connection between two panels is produced by taking an extended edge section of one panel back over an edge section of the other panel. The outcome of the folding is referred to as a folded or beaded seam or beaded edge, and the connection as a folded or beaded edge connection. In vehicle bodies, folded connections can be found at various points where two panels are joined to one another, for example on doors, trunk lids and hoods. A vehicle door, for example, may be produced from an inside panel and an outside panel, joined along their outer edges via a folded connection, which is produced by wrapping the extended edge section of the outer panel over the edge section of the inner panel in order to produce an overlapping join, and squeezing the edges with one another. A seal is then needed between the edge of the outer panel and the adjacent surface of the inside panel, in order to keep moisture out of the space between the panels and to prevent corrosion.

If the folded or beaded edge connection is sealed, the term used is that of a beaded fold seal or—where adhesive is used—of a beaded edge bond.

The bonding or sealing of sheet-metal parts in vehicle construction, especially in the case of bodies of automobiles, is frequently performed on untreated sheet-metal parts. The adhesives/sealants used in this process are cured later on in the paint drying ovens. Beforehand, the bonded/sealed parts pass through cleaning, phosphating and dip-priming stages. The adhesives/sealants can be flushed out of the bondlines by the treatment agents used in these stages. To meet these requirements, a variety of procedures have become known, with examples including the thermal/inductive pre-curing of low-viscosity adhesives/sealants in paste form, the use of adhesives in the form of solvent-containing compositions or hotmelts, as two-component products or else as shaped parts, which in general are applied manually and at the time of application possess an inherent tack.

BACKGROUND

In the context of beaded fold sealing in motor vehicle construction, it is usual, over the outwardly open region of the fold, to place a curable material, especially in the form of a bead, which in a first curing operation, of—for example—inductive heating of the sheet in the region of the curable composition, is gelled and in a downstream curing operation, particularly in the CEC oven, is completely cured. PVC in particular is used here as curable composition. This process gives rise to problems when the curable material masks air inclusions or before the ultimate curing has absorbed liquids or gases which, on the subsequent oven curing, expand and form outwardly visible bubbles. These bubbles on the one hand disturb the visual appearance (visual defects) and on the other hand form weak points in the sealing with respect to corrosive attack.

In an alternative manufacture in the context of production of parts for installation on vehicles, such as of doors, tailgates and front flaps, sliding roof tops, etc., two sheet-metal parts are joined by folding. In the bodyshell, first an adhesive is applied to the oiled metal sheet, usually consisting of steel, hot-dip-galvanized or electrolytically galvanized steel, magnesium or aluminum, along the edge of the outer part, by means of extruding, injecting or spraying methods, for example, in a layer thickness of 0.2 mm, for example, and, following insertion of the inner part, the outside edge of the outer part is beaded around the periphery of the inner part. The edge of the outer part that is at risk from corrosion is only sealed thereafter, in the finishing operation, usually by hand, with a sealant, such as PVC plastisols, for example.

WO 2011/020714 A discloses an adhesive composition based on rubbers that can be used at the same time as a beaded seam seal. This is a composition in paste form that can be applied by injection, extrusion or spraying techniques. This is also the drawback of this composition, since application errors and oozing can easily develop, and impair the visual appearance of the beaded seam.

Moreover, liquid preparations or those in paste form are generally more sensitive to being washed out in the cleaning and coating baths that are used, compared with adhesive tapes of higher viscosity.

In EP 1 041 130 A, this drawback is moderated by a method wherein the sealant/adhesive is cured in a number of stages. Drawbacks are the high levels of cost and complexity involved in the chemical implementation of a plurality of curing mechanisms within the composition, and also in the implementation of a plurality of different curing processes.

EP 1 334 161 discloses a method for making and reinforcing a joint, comprising the steps of:
a) providing two substrates between which there is a spacing to be provided with a join;
b) directly supplying a separate hotmelt thermoset material in the proximity of the spacing;
c) heating the material to cause the material to flow into and fill the defined region or spacing and to cure so as to join the substrates, the material being supplied preferably in the form of a rod. A drawback here is the high cost and complexity of the melting of the material prior to flow into the bondline. There is also a risk that the bondline will not be fully filled and that air inclusions will remain.

U.S. Pat. No. 4,719,689 A discloses a method for the simultaneous bonding and sealing of a beaded seam, wherein the beading tool is provided with a recess which shapes the adhesive emerging from the beaded seam to form a visually appealing seal layer. A drawback is that, in the case of an imprecisely metered or placed volume of adhesive, the recess is underfilled or overfilled, to the possible detriment of the sealing function and the appearance.

A further solution for avoiding the drawbacks of liquid and/or paste-like adhesives/sealants lies in the use of adhesive tapes for the bonding or sealing of beaded folds.

U.S. Pat. No. 6,000,118 A discloses a preshaped strip of adhesive composition which is squeezed during beading. As in the case of beads of adhesive, this harbors the risk of oozing.

EP 0 830 530 A discloses a sealing strip which is suitable for sealing a join between two surfaces which lie adjacently, generally in parallel planes, examples being surfaces (such as panels) which abut or overlap one another. The invention is applicable in particular, but not exclusively, to a sealing strip which is suitable for the sealing of a folded connection of the kind which may be found in a vehicle body. The sealing strip here has an inner surface for affixing the strip over the connection, and a rounded, shape-retaining outer surface; the profile of the strip is such that the outer surface of the strip, when the strip is affixed in its position over the join, extends from one of the adjoining surfaces to the other. Drawbacks with this solution are the inconvenient preshaping of the outer surface of the strip, and also the multilayer construction required.

EP 1 451 010 A and WO 2004/108401 A disclose in similar ways a flange profile sealing material which has at least two layers, for the sealing of a flange profile of metal sheets in a vehicle, where the flange profile sealing material is characterized in that it comprises an inner layer, which comprises a hotmelt/fluid thermosetting resin with a cure temperature of 80 to 200° C., and an outer layer, which shows no substantial fluidity/shape change at 80 to 200° C.; the hotmelt/fluid thermosetting resin can be liquefied and then cured in order to form a seal. The sealing material is shaped externally and completely around the flange which has already been produced. It therefore performs only a sealing function and not any substantial mechanical joining function (adhesive bonding).

WO 2012/166257 A discloses a method for producing a folded connection by first applying an adhesive tape to the inner or outer metal sheet of the folded connection, then wrapping the outer sheet around the inner sheet, so that the adhesive tape comes to lie completely between the outer and inner sheets of the folded connection, and then curing the adhesive tape. With this method, a beaded seam bond is produced. A disadvantage is that in the case of the adhesive bond, the edge of the outer folded sheet remains unprotected and has to be sealed in a further operation.

WO 2009/071269 A discloses the application of two adhesive tapes (FIG. 2 therein) to one of the metal flange sheets. During subsequent beading, the adhesive tape is squeezed out of the beaded joint and forms a seal to both the inner and outer sides of the fold. In spite of the use of an adhesive tape, there is a considerable flow process here, as in the case of the liquid adhesive, and this process harbors the drawbacks identified above.

The technology of DE 10 2016 220 237 A was supposed to achieve the object of providing a method for simultaneous bonding and sealing of a folded connection that can be carried out with low cost and complexity and produces a sealed seam which visually is an improvement of the prior art. For that purpose, the adhesive composition was applied to both surfaces of the flange of the first sheetlike element, and, after the production of the folded connection, the adhesive composition on the first surface, with the adhesive composition on the second surface of the flange of the first sheetlike element, at the edge of the flange, formed a continuous layer covering the edge of the flange of the first sheetlike element. Here, before the fold was formed, an adhesive strip was bonded around the first flange, so as to cover at least part of the area of both surfaces of the first flange.

Figure 1:
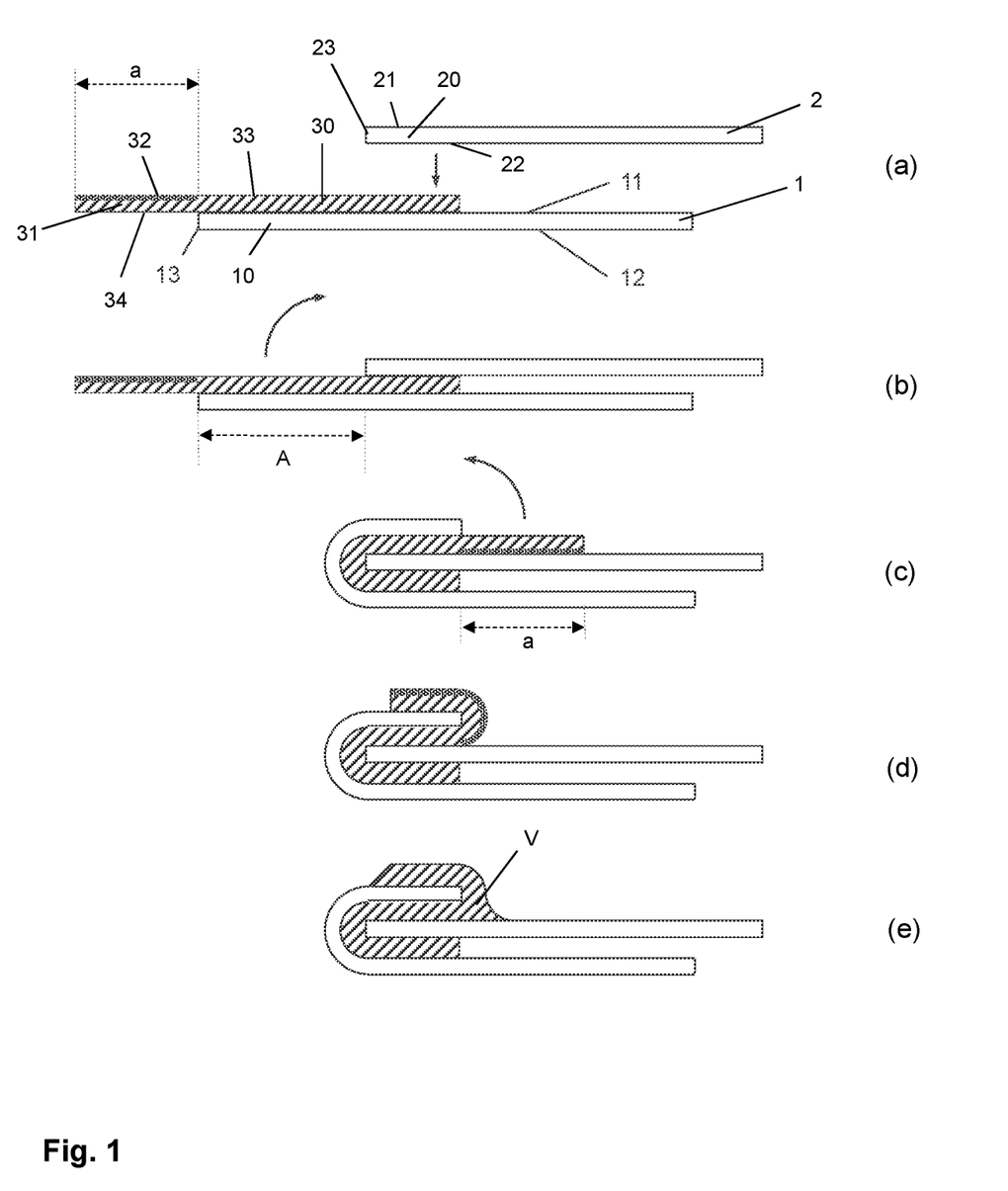
FIGS. 1(a)-1(e) shows a diagrammatic representation of the steps in producing a folded connection according to the first advantageous variant embodiment of the invention.
Figure 2:
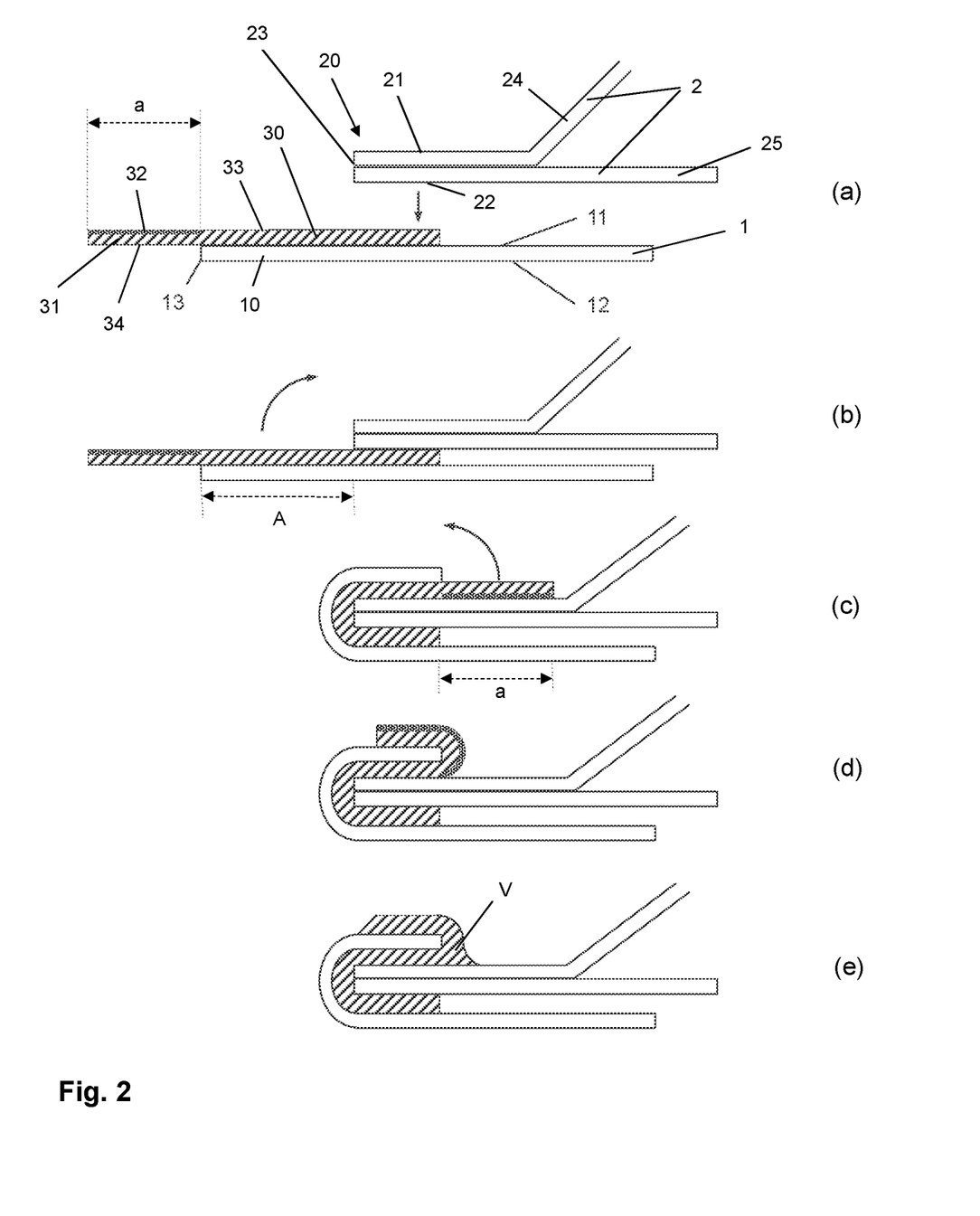
FIGS. 2(a)-2(e) shows a diagrammatic representation of the steps in producing a folded connection in an alternative of the first advantageous variant embodiment of the invention.
Figure 3:
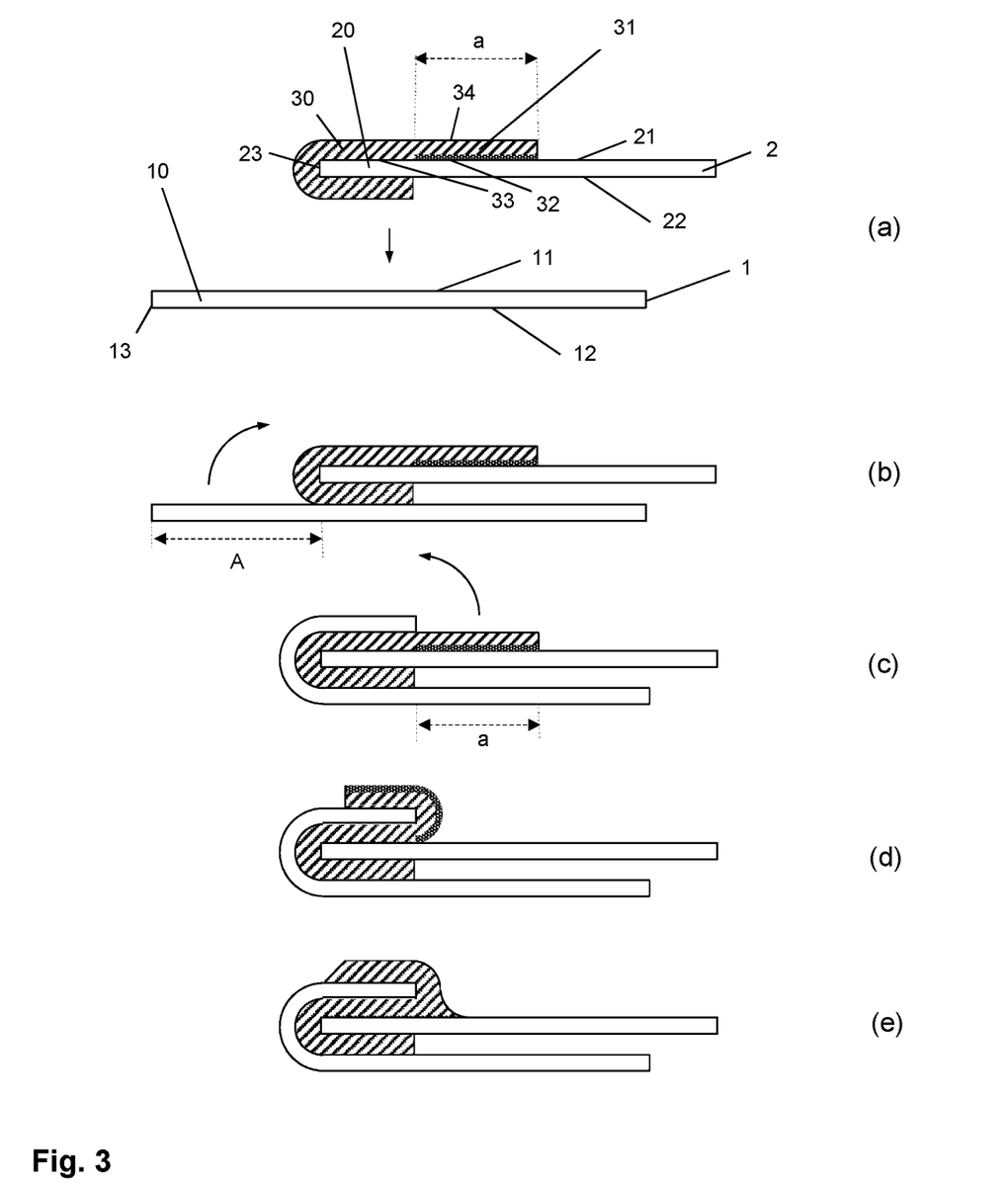
FIGS. 3(a)-3(e) shows a diagrammatic representation of the steps in producing a folded connection in an alternative of the first advantageous variant embodiment of the invention.

This procedure proves, however, to have the disadvantage that the folding of the first flange around the second flange is accomplished by application of pressure to the first flange, in the FIGS. 1-3, where it is shown there, particularly to the bottom surface of the first flange. As a consequence of this, the adhesive composition at that location is compressed or pressed away and/or squashed, so that the desired outcome of a cleanly sealed folded connection (cf., for example FIGS. 1(d), 2(d) and 3(d) there) is not achieved with sufficient satisfaction. Moreover, in the bent-around adhesive tape, there are considerable tensile stresses, which lead to warping, cracking and the like in the adhesive tape and have an adverse effect on the sealing ultimately intended.

It was an object of the present invention, therefore, to optimize the folding process. The intention more particularly was that the adhesive elements used for sealing should not be disproportionately affected during formation of the fold.

It has been possible to achieve the object by means of a method as described in the main claim of the present specification.

The invention relates accordingly to a method for producing a folded connection, sealed by means of an adhesive composition, between a first sheetlike element (1), which comes to lie externally in the fold, and a second sheetlike element (2), which comes to lie internally in the fold, where a flange (10) of the first sheetlike element (1) is taken back over a flange (20) of the second sheetlike element (2) and where the flange (10) of the first sheetlike element has a first surface (11) and a second surface (12) and where the flange (20) of the second sheetlike element (2) has a first surface (21) and a second surface (22), comprising the steps of:

(I) bonding the flange (20) of the second sheetlike element with at least one layer of an adhesive composition (30) to the flange (10) of the first sheetlike element (1), in such a way that the end (23) of the flange (20) of the second sheetlike element (2) is indented by a distance (A) relative to the end (13) of the flange (10) of the first sheetlike element (1);

(II) beading the flange (10) of the first sheetlike element (1) around the flange (20) of the second sheetlike element (2), wherein after the beading of step (II), a part (31) of the adhesive composition (30) protrudes from the beaded edge by a distance (a) of the flange (10) of the first sheetlike element (1), where at least in the region of the adhesive-composition part (31)—also referred to below as "protruding part (32) of the adhesive composition (30)" or "protruding adhesive-composition part (32)"—the surface (32) of the adhesive composition (30) that bears on the flange (20) is less tacky than the adjacent surface (33) of the adhesive composition (30) which lies within the beaded edge, where in one step (III) after the beading of step (II), the adhesive-composition part (31) is placed around the edge (13) of the first flange (10) of the first sheetlike element (1) and is bonded to the second surface (12) of the flange (10) of the first sheetlike element (1), and so after the production of the folded connection, the adhesive composition on the first surface (11), with the adhesive composition on the second surface (12) of the flange (10) of the first sheetlike element (1), at the edge (13) of the flange (10), forms a continuous layer which covers the edge (13) of the flange (10) of the first sheetlike element.

In a first preferred variant embodiment of the method of the invention, in step (I) the adhesive composition (30) is first applied to the first surface (11), lying internally in the folded connection, of the flange (10) of the first sheetlike element (1) in such a way that a part (31) of the adhesive composition (30) overhangs the edge (13) of the flange (10) of the first sheetlike element (1) by the distance (a), where at least in the region of the adhesive-composition part (31), the surface (32) of the adhesive composition (30) that is facing away from the flange (10) is less tacky than the adjacent surface (33) of the adhesive composition (30), which is facing away from the flange (10) and does not lie in the region of the adhesive-composition part (31).

The method for producing a folded connection, sealed by means of an adhesive composition, between a first sheetlike element (1), which comes to lie externally in the fold, and a second sheetlike element (2), which comes to lie internally in the fold, where a flange (10) of the first sheetlike element (1) is taken back over a flange (20) of the second sheetlike element (2) and where the flange (10) of the first sheetlike element (1) has a first surface (11) and a second surface (12), is in that case a process comprising the steps of:

(I) applying at least one layer of an adhesive composition (30) to the flange (10) of the first sheetlike element (1);
(II) beading the flange (10) of the first sheetlike element (1) around the flange (20) of the second sheetlike element (2).

In accordance with the invention, in step (I) of this variant embodiment, the adhesive composition (30) is applied to the first surface (11), lying internally in the folded connection, of the flange (10) of the first sheetlike element (1), such that a part (31) of the adhesive composition (30) overhangs the edge (13) of the flange (10) of the first sheetlike element (1) by a distance (a) and therefore in particular, so to speak, forms a free "flag". At least the surface (32), facing away from the flange (10) of the first sheetlike element (1), of the adhesive-composition part (31) overhanging this flange (10), this surface also being in contact with the flange (20) of the second sheetlike element (2), is less pressure-sensitively tacky, in terms of the material of the second flange (20), than the remaining surface of the adhesive composition (30), which is in contact with the flange (20) of the second sheetlike element (2).

In step (II), the outer flange 10 is beaded with the layer of adhesive composition (30) around the inner flange (20). The part (31) of the adhesive-composition layer (30) comes to lie in this case outside the flange (10) with beaded surround.

In a second preferred variant embodiment, in step (I), the adhesive composition (30) is firstly bonded around the end (23) of the flange (20), so that a part of the adhesive composition (30) is bonded on the second surface (22) of the flange (20) of the second sheetlike element (2) and a part of the adhesive composition is bonded on the first surface (21) of the flange (20) of the second sheetlike element (2), in such a way that on the first surface (21) of the flange (20) of the second sheetlike element (2), the segment (31) of the adhesive composition (30) with the length (a) adheres more weakly than the adjacent adhesive composition or does not adhere. In the subsequent beading of the flange (10) of the first sheetlike element (1) around the end 23 of the inner flange (20) of the second sheetlike element (2) in step (II), the end of the flange (20) of the second sheetlike element (2) then comes to lie substantially at the position on the adhesive tape (3) at which the subregion (31) of the adhesive tape with the single-sidedly peel adhesion-reduced surface (32) begins.

Independently of the variant embodiment of the procedure in step (I), the method of the invention is additionally characterized as follows.

In accordance with the invention, the tack of the surface (32), facing the flange (20), of the part (31) of the adhesive-composition layer (30) is lower than the tack of the surface (33), adjacent to the surface (32), of the adhesive tape (30); for the purposes of this specification, "reduced tack" is an expression used that encompasses the condition of nontackiness and is made use of irrespective of when and how the peel adhesion has been lowered or of whether the lower peel adhesion was already there from the start in the relevant surface region. The tackiness here pertains in particular to the material of the flange 20 that forms its surface 21 that comes into contact with the relevant adhesive-tape surfaces in the case of the folded-connection production method of the invention.

In particular, after the step (I), the second flange (20) may lie by its end section, for forming the flanged connection, in a region on the first side of the first flange (20) to which adhesive composition (30) has been applied, so that there is a region in which the adhesive composition (30) is disposed between two flanges (10, 20).

After the beading of step (II), in a step (III), the adhesive-composition part (31) is placed around the edge (13) of the first flange 10 and bonded to the second surface (12) of the flange (10) of the first sheetlike element, and so after the production of the folded connection, the adhesive composition on the first surface (11), with the adhesive composition on the second surface (12) of the flange (10) of the first sheetlike element, at the edge (13) of the flange (10), forms a continuous layer which covers the edge (13) of the flange (10) of the first sheetlike element.

Advantageously the adhesive composition is cured in an activation step (IV), in order on the one hand to bring about the ultimate peel adhesion of the bonding of the flanges with one another and on the other hand to optimize the sealing, more particularly to make it durable and/or robust. For the purposes of curing, the adhesive composition may preferably be activated thermally.

The designation of the method steps as (I) to (V) serves for linguistic characterization, but does not mean that the steps must necessarily take place immediately in succession. Where appropriate, therefore, the method of the invention may also comprise intermediate steps as well.

A flange is the term for that part of a sheetlike structure, generally located at the edge, which becomes a constituent of the folded connection, as an interior or exterior part. A flange has respectively a first surface and a second surface. The flange which comes to lie externally in the folded connection is referred to hereinafter as the outer flange, while that which comes to lie internally is referred to as the inner flange.

A folded edge or beaded edge is the part of the folded connection that is formed by the wrapping of the outer flange around the inner flange.

Sheetlike structures in the sense of the present specification are all bodies of sheetlike form. Sheetlike structures in the sense of the present specification may be single pieces—formed for example by an individual metal sheet—or else may consist of a plurality of sheetlike part-structures, forming a common surface at least in the region of the subsequent fold—for example, two metal sheets which lie one on the other in sheetlike form at least in the region of the latter folded connection. If one or both of the sheetlike structures is of multi-piece construction, the individual pieces—for instance, two metal sheets—may already be joined to one another before the folded connection is produced, by means of adhesive bonding, riveting, welding, soldering or the like, for example. Alternatively, the ultimate, permanent fastening to form a single sheetlike element may be brought about only by means of the folded connection. In the region which finally lies outside the folded connection, the sheetlike structures may deviate from the sheetlike form, or may deviate from one another in their further form in the case of the multi-piece sheetlike structures.

The adhesive-composition layer (30) is applied preferably in the form of an adhesive strip, also referred to as adhesive tape. An adhesive strip in the sense of the present specification is characterized by the fact that it brings an inherent stability to the extent that it—at least for a sufficient duration after its production to allow it to be applied and to bring about the adhesive connection; in particular, permanently—is self-supporting, in other words retaining its shape even without the ultimate substrate on which it is adhered, and not, for example, undergoing significant flow. Adhesive strips of the invention may for example be single-layer, two-layer, three-layer or multilayer.

The adhesive composition is preferably an activatable adhesive composition, and, in particular in a further step (IV), after the beading has taken place in step (II) and after placement around the edge of the outer flange has taken place in step (III) to produce the folded connection, it is activated. Activating causes the adhesive composition to cure. During the activating process, the adhesive composition preferably first becomes fluid. It flows onto the flanges, so producing a high-quality bonding and sealing. Reactive adhesive compositions which are cured by activation ("so-called structural adhesives") generally exhibit peel adhesions which are higher by orders of magnitude than those of pure pressure-sensitive adhesive compositions.

In particular, moreover, the adhesive composition is also a pressure-sensitive adhesive composition in the uncured state, i.e., before the activation step (IV). Pressure-sensitive adhesive compositions (PSAs) are, in particular, those polymeric compositions which—where appropriate by suitable additization with further components, such as, for example, tackifying resins—are permanently tacky and durably adhesive at the application temperature (at room temperature unless otherwise defined) and adhere on contact to a multiplicity of surfaces, and especially adhere immediately (having so-called "tack" [tackiness or touch-tackiness]). They are capable, even at the temperature of use, without activation by solvent or by heat—but typically through the influence of a greater or lesser pressure—of wetting a substrate to be bonded sufficiently that interactions sufficient for the adhesion can form between the composition and the substrate. Influencing parameters that are essential in this respect include the pressure and the contact time. The particular qualities of the pressure-sensitive adhesive compositions originate in particular, among other factors, from their viscoelastic properties.

Pressure-sensitive adhesive compositions can in principle be produced on the basis of polymers of different chemical nature. The pressure-sensitively adhesive properties are affected by factors including the nature and the proportions of the monomers used in the polymerization of the parent polymers of the PSA, the average molar mass and molar mass distribution, and also the nature and amount of the adjuvants to the PSA, such as tackifying resins, plasticizers, and the like. Relevant to the height of the strength of bonding of PSAs on a substrate is not only the nature of the PSA but also the nature of the substrate. On a respectively defined substrate, it is possible to realize PSAs with only little adhesion through to PSAs with very strong adhesion.

To achieve the viscoelastic properties, the monomers on which the parent polymers of the PSA are based, and also any further components present in the PSA, are especially chosen such that the pressure-sensitive adhesive composition has a glass transition temperature (according to DIN 53765) below the temperature of use (that is, customarily, below room temperature).

By means of suitable cohesion-boosting measures, such as, for example, crosslinking reactions (formation of bridge-forming linkages between the macromolecules), it is possible to enlarge and/or to shift the temperature range within which a polymer composition exhibits pressure-sensitively adhesive properties. The range of use of the PSAs can therefore be optimized by means of an adjustment between flowability and cohesion of the composition.

Where adhesive tapes having two different outer layers of adhesive composition are used (particularly in the case of multilayer adhesive strips), then it is preferably sufficient for at least one, and very preferably sufficient for both, layer(s) of adhesive composition to be an activatable adhesive composition, also in particular a pressure-sensitive adhesive composition, in accordance with the characterization above.

At least on the region 32 of the surface of the protruding part 31 of the adhesive-composition layer 30 that in the method of the invention comes into contact with the surface 21 of the second flange 20 and is placed around the edge (13) of the outer flange (20), the tack is lower than in the rest of the region of the surface of the adhesive composition 30; and, in particular, lower than in the adjacent region 33 of the surface of the adhesive-composition layer 30. In one preferred procedure the adhesive-composition layer on the top surface 32 in the protruding adhesive-composition layer part 31 is nontacky. In the context of this specification, the term used in this context is that of a "reduced" tack, irrespective of how the reduced tack is brought about in the region in question and irrespective of whether it was already present initially or whether it was brought about subsequently, starting from the tack in the rest of the surface region of the adhesive-composition layer. In this way, the adhesive-composition layer possesses a surface which, after beading around the second flange 20, does not stick to the flange 20, and can easily be parted from it again, in order in turn to be placed around the end 13 of the first flange (cf. also FIG. 1 (4)). In particular, in this surface region 32 of the part 31 of the adhesive-composition layer 30, the original tack thereof may have been lowered. The tack may be lowered by reducing the initial tack in the relevant surface region, leaving a residual tack, or else by the corresponding surface region no longer having any tack (the adhesive-composition layer there, then, being nontacky). A remaining slight tack there has the advantage that, during the method, the adhesive-composition layer can easily be fixed on the first flange and held in position, but for the further method steps can easily be removed from the flange again, advantageously leaving behind no residues there.

The lowering of the tack may be accomplished, for example, by chemical or physical deactivation of the adhesive-composition surface in the region in question, for instance by poisoning, covering, irradiating or the like. Hiding may take place either permanently (by means of powder covering, permanent film covering, and so on) or temporarily, as for instance by the use of an antiadhesively furnished masking film (so-called liner), which, after the adhesive layer 30 has attained the bent-round state (as depicted in FIG. 1 (4)) can be removed again, to restore the original tack of the adhesive-composition layer. The reduction in the peel adhesion may also be brought about, for example, by the application, in the region in question, of a thin layer of a second pressure-sensitive adhesive composition with an initially low peel adhesion, to the surface of the adhesive-composition surface which is being utilized for fold bonding. The reduction may also be accomplished by lowering the peel adhesion of the part-surface 32 in question not over the full area but instead only locally—for instance in a multiplicity of individual locations, for instance in the form of dots, stripes or the like—with the overall effect of a reduction in peel adhesion over the entire part-surface 32.

On the side of the adhesive tape opposite the surfaces 32 and 33, comprising the surface 34 and any adjoining regions, the tack is preferably high, so that there is relatively firm fixing on the first surface 11 of the flange 10 and also, after wrapping of the adhesive tape around the edge of the flange 10, on the second surface of the flange 10.

As set out above, both single-layer adhesive strips and multilayer adhesive strips are advantageous in accordance with the invention. The carrier material—especially for multilayer adhesive tapes—embraces all sheetlike structures, examples being two-dimensionally extended films or film sections, tapes with extended length and limited width, tape sections, diecuts, multilayer arrangements, and the like. For different applications it is possible in this context to combine a wide variety of different carriers such as, for example, films, wovens, nonwovens, and papers, with different adhesives.

As observed above, adhesive strips of the invention may for example be single-layer—formed of a single adhesive-composition layer—, two-layer—formed of two—in particular, but not necessarily, different—adhesive-composition layers in sheetlike assembly—, three-layer—two identical or two different adhesive-composition layers with a layer disposed in between, such as (permanent) carrier layer—or multilayer—two outer identical or different adhesive-composition layers with two or more interlayers disposed between them.

Single-layer adhesive-composition layers have, in particular, a cohesion which is sufficient for inherent stability, and can be employed with preference in accordance with the invention. Adhesive tapes composed of two assembled adhesive composition layers offer the advantage that in terms of the adhesive compositions used, they can be adapted to different materials of the sheetlike structures forming the flanges. Advantageously at least one of the adhesive-composition layers has a stability such that the overall adhesive strip has sufficient inherent stability for the application. Systems likewise to be used advantageously or, for example, double-sided systems, comprising two identical or different adhesive-composition layers with carrier material in a sheetlike arrangement between them, this carrier material remaining permanently in the adhesive tape (three-layer constructions), may likewise be adapted, in terms of the adhesive compositions used, to the materials used in the sheetlike structure, and/or, through the use of an internal layer of a permanent carrier material, the adhesive tape may actually be given an inherent stability (in the case of very soft adhesive compositions, for instance) or else may be reinforced. Carrier layers, moreover, may provide further functions—such as barrier functions, blocking functions, absorption functions, flexibility, modification of the stretchability of the adhesive strip, and so on. More than three-layer adhesive strips (multilayer constructions) may comprise further interlayers and so, for instance, functional layers (for instance with functions as set out above) may be present in addition to one or more carrier layers. Especially preferred are single-layer adhesive strips.

(Permanent) carrier materials used for an adhesive tape preferably comprise polymer films, film assemblies or else films or film assemblies provided with organic and/or inorganic layers. Films/film assemblies of these kinds may consist of all common plastics used for producing films, as for example—though without limitation—the following: polyethylene, polypropylene—particularly the oriented polypropylene (OPP) produced by mono- or biaxial drawing, cyclic olefin copolymers (COCs), polyvinyl chloride (PVC), polyesters—especially polyethylene terephthalate (PET) and polyethylene naphthalate (PEN), ethylene-vinyl alcohol (EVOH), polyvinylidene chloride (PVDC), polyvinylidene fluoride (PVDF), polyacrylonitrile (PAN), polycarbonate (PC), polyamide (PA), polyethersulfone (PES) or polyimide (PI).

The carrier material preferably has a softening temperature which lies below the activation temperature of the adhesive composition. In this case, when the adhesive composition is activated, the carrier material softens and is able to flow and so to compensate stresses due to shrinkage or expansion.

One or both surfaces of the adhesive-composition layers used—especially pressure-sensitive adhesive-composition layers—may advantageously be lined temporarily with a lining material—or liner—in order to ensure easy storage, application and/or handling otherwise. Another purpose of liners in particular is to protect temporarily exposed surfaces of adhesive composition, and/or to prevent unwanted sticking of these surfaces.

Pressure-sensitive adhesive tapes coated on one or both sides with adhesives are usually wound up to form a roll in the form of an archimedean spiral or in cross-wound form at the end of the production process. To prevent the adhesive compositions making contact with one another in the case of double-sided adhesive tapes, or in order to prevent the adhesive composition sticking to the carrier in the case of single-sided adhesive tapes, the adhesive tapes prior to winding are also customarily lined with a liner material (also referred to as release material) which is wound up together with the adhesive tape. The skilled person also knows such liner materials under the name of liners or release liners. In addition to the lining of single-sided or double-sided adhesive tapes, liners are also used for enclosing pure adhesive compositions (single-layer adhesive strips; also referred to as adhesive transfer tape) and adhesive tape sections (labels, for example). These liners additionally ensure that the adhesive composition is not fouled prior to the application.

A liner is not a constituent of an adhesive tape, but rather only an aid to its production, storage or further processing. Similarly, the assembly is only temporary and not permanent.

A prior-art liner consists of at least one adhesive layer (release layer) in order to lower the tendency of adhering products to adhere with respect to these surfaces (active release function). This layer may be applied on a carrier material.

Release layers which can be used are all of the systems known to the skilled person, especially those referred to in the "Handbook of Pressure Sensitive Adhesive Technology" by Donatas Satas (Satas & Associates, Warwick 1999). According to the prior art, the material of the adhesive release layer is preferably selected from the group encompassing silicones, fluorinated silicones, silicone copolymers, waxes, carbamates, fluoropolymers and polyolefins, or mixtures of two or more of the compounds stated.

As liner carrier material it is possible in particular to use papers or films. Films used in this case are preferably those made of biaxially oriented polyethylene terephthalate, polybutene, polypropylene, polyethylene, monoaxially oriented polypropylene, biaxially oriented polypropylene or polyethylene, with particular preference polyolefin films (polypropylene and polyethylene films) or polyester films. Polymer-coated papers or nonwovens are also encountered.

This liner is removed at least from the adhesive tape or part of the adhesive tape that is located on the first surface of the outer flange, this removal being performed before the beading. Preferably the liner is removed only on the adhesive tape or part of the adhesive tape that is located on the first surface of the outer flange, so that during beading there is no adhesion to the beading tool. In the embodiment of a single adhesive tape with bonding around, this is facilitated by a liner which is perforated or in two parts in the longitudinal direction of the adhesive tape, with in that case only one part being removed before the beading.

In one variant of the method of the invention, the side of the adhesive-composition layer facing away from the outer flange 10 [cf. FIGS. 1(a), 2(a), upper surface of the adhesive tape 30 therein] is first lined with a perforated or slotted liner, the perforation or slot running in particular at the transition of the surface region 32 to the surface region 33. Before the application of the flange 20 and the beading of the flange 10 and the flange 20, the part of the liner that is not lying on the part-surface 32 is removed, whereas the part-surface 32 remains lined and so is reduced in its tack (or is present in an outwardly nontacky form). After the placement of the adhesive-composition layer 30 around the edge 13 of the outer flange 10 in step (III), but before the curing in step (IV), it is then possible optionally, if desired, to remove the liner from the part-surface 32 as well; this, however, is not mandatory in the inventive sense. Hence the liner in this region, particularly if, for example, in the course of curing it undergoes permanent "baking" to the corresponding part 31 of the adhesive composition layer 30 permanently, may serve as a (permanent) layer on the cured adhesive-composition layer, which offers additional—mechanical or chemical, for instance—protection or contributes to a good visual appearance on the part of the sealing point.

Disclosed accordingly is the use of an adhesive tape with a multi-part or perforated liner during the production of a folded bond and seal.

In another preferred version, the adhesive tape is an adhesive tape consisting of two strips disposed parallel to one another and comprising different adhesive compositions. These strips are arranged next to one another on a single liner so closely that they are connected to one another or that a connection comes about in the course of the method. The second adhesive composition, located on the second surface of the outer flange, preferably has a lower modulus of elasticity, after an optional activation step, than the first adhesive composition, which is located on the first surface. This prevents the incidence of cracks in the surface of the second adhesive composition as a result, for example, of thermal processes of expansion and/or shrinkage during further steps in the method to which the flanged connection is subject, and so leads to a visually better appearance.

In a further-preferred version, the adhesive tape bonded around the edge of the flange is a partially single-sided adhesive tape. In this arrangement the carrier material is applied in longitudinal direction only to the part of the width of the adhesive tape that comes to lie on the second side of the outer flange. Consequently, the part of the adhesive tape that comes to lie on the visible side of the folded connection is lined with a carrier material and is therefore more visually appealing and also better protected from ambient effects. Here, the carrier material may also be guided around the edge of the flange, or the edge may be free from carrier material. The former is preferred, since in that case the edge is better protected mechanically.

Also disclosed, therefore, is an adhesive tape and also its use in the production of a folded bond, said tape being provided in longitudinal direction only for part of its width with a carrier material or a liner material. Disclosed, therefore, is a partially double-sided adhesive tape for producing a sealed folded connection, consisting of a carrier material and a liner material, a first strip of a first adhesive composition, a second strip of a second adhesive composition, where the second adhesive composition may be different from the first, the two adhesive-composition strips are arranged next to one another in longitudinal direction, and the liner covers at least one of the two adhesive-composition strips, where the carrier material hides only the second adhesive-composition strip and the liner hides at least the first adhesive-composition strip.

The adhesive composition is preferably an activatable pressure-sensitive adhesive composition, more particularly a thermally activatable pressure-sensitive adhesive composition. The carrier or liner material is preferably a thermoplastic polymer whose softening temperature lies below the activation temperature of the adhesive composition. This has the advantage that on activation of the adhesive composition, the material flows and is therefore able to compensate stresses due to shrinkage or expansion.

It is preferred, furthermore, for the adhesive composition of the second adhesive-composition strip, which is hidden by the carrier material, to have a lower modulus of elasticity after activation than the adhesive composition of the first adhesive-composition strip.

The adhesive composition used may comprise pressure-sensitive adhesive compositions, hotmelt adhesive compositions or activatable adhesive compositions.

Especially preferred is an activatable pressure-sensitive adhesive composition. This has the advantage that an adhesive assembly of the sheetlike structure is produced even before activation. The activation then increases the strength of the adhesive join.

Suitable activatable pressure-sensitive adhesives include all known activatable pressure-sensitive adhesives. Compositions and production of such activatable pressure-sensitive adhesive compositions are known and familiar to the skilled person.

Particularly suitable activatable pressure-sensitive adhesive compositions are those prepared from compounds having at least one of the following functional groups: epoxides, amines, ureido groups, hydroxyl groups, ether groups, acid groups, especially carboxylic acid groups, preferably acrylic and methacrylic acid groups, and carboxylic anhydride groups, ester groups and amide groups, isocyanates, imidazoles, phenolic groups, urea groups, silane groups, ethylenic double bonds, especially in conjunction with initiator groups which are able to initiate a radical polymerization, or with sulfur-containing vulcanizing agents.

The activatable pressure-sensitive adhesive compositions may selectively comprise one or more further formulating ingredients such as, for example, curing agents, reaction accelerators, catalysts, initiators, fillers, microspheres, tackifier resins, non-reactive resins, plasticizers, binders, bitumen, ageing inhibitors (antioxidants), light stabilizers, UV absorbers, rheological additives, and also other auxiliaries and adjuvants.

Examples of suitable adhesive compositions for the present invention are found in EP 1 334 161 B1, in EP 0 877 069 B1, in EP 0 842 995 B1, in U.S. Pat. No. 6,294,270 B1, in US 2010/0137530 A1, in US 2012/0111488 A1, in WO 1996/021704 A2, in WO 2011/112643 A2 or in WO 2013/101693 A1, this enumeration being purely exemplary and in no way exhaustive.

In one particularly preferred embodiment, the activatable adhesive composition is expandable. Expandable in this context means that the volume of the adhesive composition after expansion is above that of the adhesive composition before the expansion, measured in each case at the same temperature (generally room temperature, 15 to 30° C.). The increase in volume is preferably more than 5%. Expansion may be accomplished chemically or physically. The adhesive composition preferably comprises a thermally activatable foaming agent.

In this case the activatable, foaming agent-filled adhesive composition after foaming preferably has a density of 900 kg/m$^3$, more particularly of 700 kg/m$^3$.

According to one advantageous embodiment, the foaming agent comprises microspheres which consist of a polymer membrane enclosing a blowing agent—microballoons, as they are known. The proportion of these microballoons in the adhesive composition is more preferably between 0.5 and 20 wt %, with further preference between 2 and 12 wt %. Microballoons are hollow elastic spheres which have a thermoplastic polymer shell. These spheres are filled with low-boiling liquids or liquefied gas. Shell materials used include, in particular, polyacrylonitrile, PVDC, PVC or polyacrylates. Suitable low-boiling liquid comprises, in particular, hydrocarbons of the lower alkanes, as for example isobutane or isopentane, which are enclosed in the form of liquefied gas under pressure in the polymer shell. Action on the microballoons, particularly through exposure to heat, results first in softening of the outer polymer shell. At the same time, the liquid blowing gas present within the shell is converted into its gaseous state. The microballoons expand irreversibly and three-dimensionally. Expansion is at an end when the internal pressure is equal to the external pressure. Since the polymeric shell is retained, the result is a closed-cell foam.

The expansion of the adhesive composition takes place preferably parallel to the activation in step (IV). In another preferred embodiment, the expansion takes place following the activation in a further step (V).

Another effect of using an expandable adhesive composition is that the cavity not filled with adhesive composition, in the case of one variant of flange formation, becomes filled with adhesive composition.

The method of the invention can be applied with particular advantage in the automobile industry, and there in particular for the production and sealing of folds as part of the manufacture of vehicle bodies. The sheetlike elements may for example be made both of metal, both of surface-treated metal, both of galvanized metal, both of plastic, both of painted metals or painted plastics or the like. The metal of the two sheetlike elements may also be different, in which case the respective material may again come, for example, from the recitation above. In particular, folded connections of two metal sheets are produced, though in principle the method of the invention can also be employed for all other materials, such as, in particular, plastics, and also for the production of a fold of a metal with a plastic. Folded connections in bodywork construction, for which the method of the invention is outstandingly suitable, occur, for instance, on doors, on trunk lids, on hoods, on the roof extension, and the like.

A protective effect of the sealing results in particular from the fact that in the course of the sealing procedure, the adhesive softens, possibly even becoming a liquid melt, and, in so doing, conforms to and wets any irregularities in the sheetlike elements. In this case, holes, cavities, seams and the like may be filled, and air inclusions and bubbles may be pressed away from the irregularity by the conforming adhesive, especially for adhesives which are fluid melts during the sealing operation. The protective effect can be boosted by the adhesive composition used possessing a barrier effect for permeants. The hardening of the adhesive composition not only joins the sheetlike elements but also protects the seam site permanently.

The sealing site, following the curing of the adhesive composition, may advantageously be painted, in particular together with the entire body in customary painting processes, such as by dip painting, for example.

In an alternative procedure, the sealing site may also be painted with local limitation, particularly if the bodywork has already been given its final finish before; in this case, the locally limited painting may take place advantageously with the original finish, the same one used to paint the body, or with another coating material, as for instance a paint corresponding substantially in color to the car finish, this coating material possibly having been adapted especially, for example, to the polymeric material of the film layer.

In FIG. 1-3, the invention is illustrated in more detail with selected examples. The choice and representation of the examples is not intended to impose any unnecessary restriction on the invention as a whole. In these drawings:

FIGS. 1(a)-1(e) shows the first preferred variant embodiment of the method of the invention. Depicted in FIG. 1(a) is an outer flange 10 of a first sheetlike structure 1 having a first surface 11 and a second surface 12. On the first surface 11 of the first, outer flange 10 there is an applied layer 30 of adhesive composition, presently in the form of a single-layer adhesive tape (step (I) of the method of the invention). Representation as a single-layer adhesive tape here is by way of example; the aforesaid further embodiments of the adhesive tape layer, as set out above—in the form, for example, of a double-sided multilayer adhesive tape—can likewise be realized advantageously. The adhesive-composition layer 30—here the adhesive tape—is positioned in such a way that it protrudes partly—by the distance a—over the edge 13 of the flange 10 of the first sheetlike element 1, with the protruding part forming the adhesive tape part 31. At least the region 32 of the surface of the adhesive-composition layer 30 that belongs to the protruding part and lies on that side of the adhesive-composition layer 30 that faces away from the flange 10 of the first sheetlike structure 1 has a lower tack than the rest of the surface of the adhesive-composition layer 30. The expression "lower tack" includes the absence of tack. The reduced-tack surface region 32 advantageously finishes toward the flange side at the height of its edge 13. The second—inner—flange 20 [having a first surface 21 and a second surface 22] of the second sheetlike structure 2 is shown still at a distance from the first flange 10.

To produce the folded connection, the second—inner—flange 20 of the second sheetlike structure 2 is brought into contact via its second surface 22 with the adhesive tape 30 on the first surface 11 of the first—outer—flange 10 of the first sheetlike structure 1—compare in this regard FIG. 1(b). For forming the flange connection, the second flange 20 may lie with its end section in a region on the first side of the first flange 10 to which adhesive-composition layer 30 has been applied, so that there is a region in which the adhesive composition 30 is disposed between the two flanges 10, 20. The edge 13 of the outer flange 10 of the first sheetlike structure 1 and the edge 23 of the inner flange 20 of the second sheetlike structure 2 are distanced by the distance A.

Subsequently the first—outer—flange 10 of the first sheetlike structure 1 is beaded (step (II) of the method of the invention; see arrow in FIG. 1(b)) around the second—inner—flange 20 of the second sheetlike structure 2, so that the reduced-tack subregion 32 and also its bordering region 33 of the surface of the adhesive-composition layer 30 comes into contact with the surface 21 of the flange 20—compare in this regard FIG. 1(c). The protruding part 31 of the adhesive-composition layer 30 comes in this case to lie outside the beaded flange 10. In FIG. 1(c), after the beading of step (II), the component present therefore has a part 31 of the adhesive composition 30 protruding from the beaded edge by a distance a of the flange 10 of the first sheetlike element 1; at least in the region of the adhesive-composition part 31, the surface 32 of the adhesive composition 30 that bears on the flange 20 is less tacky than the adjacent surface 33 of the adhesive composition 30, which lies within the beaded edge.

The reduced-tack—nonadhesive or weakly adhesive—surface 32 of the subregion 31, outside the end section of the beaded outer flange 10, prevents the adhesive tape 30 attaching to the inner flange 20 of the second sheetlike element 2, or permits attachment only of a kind which is easily redetachable, whereas the region 33 of the surface of the adhesive composition layer 30 that borders the region 32 (lying within the beading) adheres more firmly. Application of the adhesive composition in the form of adhesive tape 30 means that there is no oozing of the adhesive composition, as would be the case with liquid adhesives. Since the adhesive-composition layer 30 is (as yet) not bonded around the edge 13, there are, within the adhesive composition layer 30, none of the tensile stresses of the kind which are observed in a method according to DE 10 2016 220 237 A and which lead to the problems described at the outset. The other problems, described at the outset, of the method of DE 10 2016 220 237 A can also be avoided in this way.

For sealing the edge 13, in the further step (III)—compare in this regard FIG. 1(d)—the one-sidedly reduced-tack—nonadhesive or weakly adhesive—subregion 31 of the adhesive tape 30 is taken around the first—outer—flange 10 and, with the adhesive surface 34, opposite the reduced-tack region 32, is applied to the exterior surface 12 of the beaded flange 10 of the first sheetlike element 1. The edge 13 of the flange 10 of the first sheetlike element 1 is here covered by the adhesive tape 30. Optionally it is then possible for auxiliaries which had been used to lower the tack of the surface 32 in the region 31 of the adhesive tape 30—such as applied liners, for example—to be removed, so that the surface now exposed appears pressure-sensitively adhesive again before the activation, unless such auxiliaries are not intended to remain in the bonded assembly (this step is not shown in the drawing). As a result of the activation, the exposed surface of adhesive composition may then, for example, lose its pressure-sensitively adhesive properties, for instance such that finally there is a smooth (varnishlike) surface present. If, alternatively, the auxiliaries remain on the surface before the activation, then they may, for example, in the course of the curing, undergo permanent "baking" permanently to the corresponding part 31 of the adhesive-composition layer 30 and may serve as a (permanent) layer on the fully cured layer of adhesive composition, providing additional—mechanical or chemical, for instance—protection or contributing to a good visual appearance on the part of the sealing site.

The adhesive tape 30 is then cured in a thermal activation step (IV), thus resulting in an assembly as per FIG. 1(e). During the activation process, the adhesive tape 30, including the single-sidedly reduced-tack—nonadhesive or weakly adhesive there—subregion 31, first becomes fluid, so that the adhesive tape 30, including the single-sidedly reduced-tack—nonadhesive or weakly adhesive—subregion 31 flows onto the flanges 10, 20, and hence a high-strength bond and effective seal is produced. The region of the edge 13 of the first flange 10, and the gap between the first flange 10 and the second flange 20, are outstandingly well-sealed (sealing site V).

FIGS. 2(a)-2(e) shows likewise the first preferred variant embodiment of the method of the invention, here in the example of the inventive production of a folded connection via a second sheetlike element 2, which is assembled from two metal sheets.

In particular, the second sheetlike element may be formed of two metal sheets lying one atop another, which lie on one another in the folded connection. In this case the two sheets of the second sheetlike element may be connected to one another even before the production of the folded connection—being, for instance, bonded, riveted, soldered or the like to one another—or else the two sheets of the second sheetlike bond are connected to one another permanently only by means of the folded connection.

By way of example, and without any restricting intention on the concept of the invention, FIG. 2(a) shows a sheetlike element 2 of this kind, consisting of two individual metal sheets, 25, and forming the flange 20. Depicted there by way of example is the fact that the individual sheets 24, 25, in the region which afterwards lies outside the folded connection, deviate from one another in their further course of shape, with the upper sheet 24 being bent at an angle from the other, lower sheet 25. This further course of the sheets 24, 25 is represented only by way of example, however, and is not intended to restrict the general inventive concept.

The two sheets 24 and 25 may on the one hand already be fixed to one another in the region in which they lie together, or alternatively may be brought into the folding process without being fixed, with positioning one atop the other.

The inner flange 20 of the second, two-piece sheetlike element 2 made up of the two sheets 24, 25 is brought into contact with the surface 22 of the lower sheet 25 by the adhesive-composition layer 30; the flanges 10 and 20 are at a distance A from one another. Thereafter the flange 10 of the first sheetlike element 1 is beaded around the inner flange 20 (cf. FIG. 2(b)) and the adhesive-composition layer 30 is brought into contact with the surface 21 of the upper sheet 24. The resulting component, according to FIG. 2(c), is similar to that in FIG. 1(c), with the difference that the flange 20 is of a two-piece design.

The method steps in the method according to FIGS. 2(a)-2(e) are otherwise identical to the conduct of the method as shown in FIGS. 1(a)-1(e); accordingly, reference is made to the statements and positional numbers there. The designation of the FIGS. 1(a)-1(e) can be replaced correspondingly by FIGS. 2(a)-2(e). In the resulting folded connection, the inner flange 20 is in two pieces and the sheets 24, 25, in particular after the curing of the adhesive-composition layer 30, are also fixed to one another in this position lying within the fold; or, respectively, a folded connection is produced in which the fixing, if already existing beforehand, is further strengthened.

FIGS. 3(a)-3(e) shows the second preferred variant embodiment of the method of the invention. FIG. 3(a) shows an inner flange 20 of a first sheetlike structure having a first surface 21 and a second surface 22, with an adhesive-composition layer 30—more particularly an adhesive tape—applied around the edge 23 to both surfaces. The edge 23 of the inner flange 20 is therefore likewise covered by the adhesive tape 30.

In FIG. 3(a), the adhesive tape 30 is seen in a state in which it is already applied to the inner flange 20. The adhesive tape 30 is wrapped around the surface 22, and so the edge 23 is covered. The nonadhesive or weakly adhesive surface 32—bearing on the flange 20—of the subregion 31 of the adhesive tape 30 partially prevents the adhesion of the adhesive tape on the surface 21 of the flange 20. Conversely, the subsequent surface 33 of the adhesive tape 30 is bonded with greater adhesion to the surface 21 of the flange 20, and, in particular, the surface 34 as well that bears on the surface 22 of the flange 20. For both part-surfaces 33, 34, already high forces of adhesion to the surfaces 21 and 22, respectively, to which they are bonded are advantageous. The outer flange 10 of the second sheetlike structure is shown still at a distance from the first flange 20.

To produce the folded connection, in step (I), the inner flange 20, furnished with the adhesive tape 30, is brought into contact by means of the adhesive tape 30 with the first surface 11 of the outer flange 10 (FIG. 3(a)), thus forming a component in which the edges 23 of the inner flange 21 of the second sheetlike structure and edge 13 of the outer flange 10 of the first sheetlike structure 1 are disposed at a distance A from one another (cf. FIG. 3(b)); then, in step (II), the outer flange 10 is beaded around the inner flange 20 (cf. the arrow in FIG. 3(b)) and adhered to the adhesive composition 30, to form the intermediate product as per FIG. 3(c) [the intermediate product as per FIG. 3(c) corresponds to the intermediate products as per FIG. 1(c) and FIG. 2(c)].

As a result of application of the adhesive composition in the form of adhesive tape 30, there is no oozing of the adhesive composition, as would be the case with liquid adhesives. The component present in FIG. 3(c), after the beading of step (II), is one in which a part 31 of the adhesive composition 30 protrudes by a distance a from the beaded edge formed by the bent-round flange 10 of the first sheetlike element 1. In this case, at least in the region of the adhesive-composition part 31 protruding from the beaded edge, the surface 32 of the adhesive composition 30 that bears on the flange 20 is less tacky than the adjacent surface 33 of the adhesive composition 30 that lies within the beaded edge.

Steps (III) and the following steps below are carried out as already described in detail for FIGS. 1(a)-1(e); the reference therein to FIGS. 1(c)-1(e) should be replaced correspondingly by the reference to FIGS. 3(c)-3(e).

For the method depicted in FIGS. 3(a)-3(e) as well, of course, it is possible to employ alternative embodiments of the sheetlike structures used—for example, double-layer sheetlike structures 2 composed of two metal sheets, as in the method according to FIGS. 2(a)-2(e).

Figure 4:
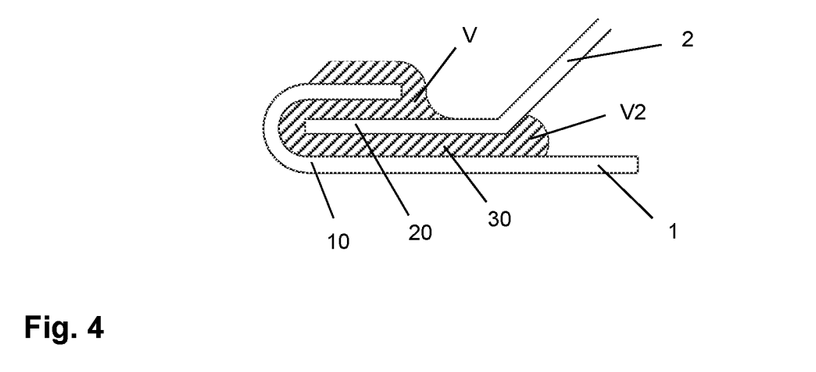
FIG. 4 shows a diagrammatic representation of a possible additional sealing site, the flanges and the folded connection each being shown in cross section.

FIG. 4 shows by way of example how—in addition to the first sealing site V—the gap site between the inner flange 20 of the second sheetlike element 2 and the outer flange 10 of the first sheetlike element 1, lying outside the folded connection, can also be advantageously sealed by the adhesive composition after curing (sealing site V2). This is advantageous, for example, in a case of the kind depicted by way of example in FIGS. 2(a)-2(e), in which the second sheetlike element 2 is angled off and the gap site in this case has an increased spatial opening.

The invention claimed is:

1. A method for producing a folded connection, sealed by means of an adhesive composition, between a first sheetlike element and a second sheetlike element, wherein the first sheetlike element comes to lie externally with respect to the folded connection and the second sheetlike element comes to lie internally with respect to the folded connection, a first flange of the first sheetlike element has a first end, a first surface, and a second surface opposite with respect to the first surface of the first flange and is taken back over a second flange of the second sheetlike element, and the second flange of the second sheetlike element has an end, a first surface, and a second surface opposite with respect to the first surface of the second flange, the method comprising:

(I) bonding the second flange of the second sheetlike element with at least one layer of an adhesive composition to the first flange of the first sheetlike element, in such that an end of the second flange of the second sheetlike element is indented by a distance (A) relative to the first end of the first flange of the first sheetlike element;

(II) beading the first flange of the first sheetlike element around the second flange of the second sheetlike element to produce a beaded edge, wherein, after the beading of (II), an adhesive-composition part of the at least one layer of the adhesive composition protrudes from the beaded edge by a distance (a) from the first end of the first flange of the first sheetlike element and, at least in a region of the adhesive-composition part, a surface of the adhesive composition that bears on the second flange is less tacky than an adjacent surface of the adhesive composition which lies within the beaded edge; and (III) placing, after the beading of (II), the adhesive-composition part around an edge at the first end of the first flange of the first sheetlike element and bonding to the second surface of the first flange of the first sheetlike element, wherein, after the production of the folded connection, the adhesive composition on the first surface, with the adhesive composition on the second surface of the first flange of the first sheetlike element, on the edge at the first end of the first flange, forms a continuous layer covering the edge of the first flange of the first sheetlike element.

2. The method of claim 1, wherein, in (I), the adhesive composition is initially applied to the first surface of the first sheetlike element, lying internally in the folded connection, in such a way that the adhesive-composition part overhangs the edge of the first flange of the first sheetlike element by the distance (a), wherein, at least in the region of the adhesive-composition part, the surface of the adhesive composition that is facing away from the first flange is less tacky than the adjacent surface of the adhesive composition that is facing away from the first flange and that does not lie in the region of the adhesive-composition part.

3. The method of claim 1, wherein, in (I), the adhesive composition is firstly bonded around the end of the second flange, and so the adhesive-composition part is bonded on the second surface of the second flange of the second sheetlike element and a part of the adhesive composition is bonded on the first surface of the second flange of the second sheetlike element, in such a way that on the first surface of the second flange of the second sheetlike element, a segment of the adhesive composition with the length (a) adheres more weakly than the adjacent adhesive composition or does not adhere.

4. The method of claim 1, wherein a lower tack on surface of the adhesive composition that bears on the second flange in a region of the adhesive-composition part is accomplished by chemical or physical deactivation of an adhesive-composition surface.

5. The method of claim 4, wherein the chemical or physical deactivation of the adhesive-composition surface is by poisoning, covering, or irradiating.

6. The method of claim 1, wherein the surface of the adhesive composition that bears on the second flange in a region of the adhesive-composition part is substantially nontacky.

7. The method of claim 1, further comprising:
(IV) activating the adhesive composition that is an activatable adhesive composition and producing the folded connection.

8. The method of claim 1, wherein the adhesive composition is applied as an adhesive tape.

9. The method of claim 8, wherein the adhesive tape is single-layer.

10. The method of claim 8, wherein the adhesive tape is provided at least partially with a carrier material.

11. The method of claim 10, wherein the carrier material has a softening temperature that lies below the activation temperature of the adhesive composition.

12. The method of claim 1, wherein the adhesive composition is a pressure-sensitive adhesive, a hotmelt adhesive composition, an activatable adhesive composition, or an activatable pressure-sensitive adhesive composition.

13. The method of claim 7, wherein the adhesive composition is an expandable adhesive composition.

14. The method of claim 13, wherein the expansion of the adhesive composition takes place parallel to the activation in (IV) or subsequent to (IV).

15. A folded connection obtainable by the method of claim 1.

16. An adhesive tape comprising the folded connection of claim 15.

17. An automobile construction comprising the folded connection of claim 15.

18. The automobile construction of claim 17, wherein the automobile construction is at least one bodywork manufacture.

* * * * *